United States Patent [19]
Takahata et al.

[11] Patent Number: 5,047,943
[45] Date of Patent: Sep. 10, 1991

[54] SYSTEM AND METHOD FOR DETECTING ENGINE REVOLUTION SPEED, IDENTIFYING ENGINE CYLINDER, AND CONTROLLING ENGINE OPERATION ACCORDING TO DETECTED ENGINE REVOLUTION SPEED AND IDENTIFIED CYLINDER

[75] Inventors: Toshio Takahata; Masahiro Hisatomi; Yoshihiro Okada, all of Kanagawa, Japan

[73] Assignee: Nissan Motor Company, Ltd., Yokohama, Japan

[21] Appl. No.: 440,559

[22] Filed: Nov. 22, 1989

[30] Foreign Application Priority Data

Nov. 22, 1988 [JP] Japan ................. 63-295251
Nov. 22, 1988 [JP] Japan ................. 63-295252
Dec. 22, 1988 [JP] Japan ................. 63-325102

[51] Int. Cl.$^5$ ............... G06F 15/48; G06F 15/50; F02P 5/00
[52] U.S. Cl. ............... 364/431.03; 123/406; 123/414; 123/612; 364/431.05
[58] Field of Search ............ 364/431.03, 431.04, 364/431.05, 431.07; 123/612, 613, 643, 414, 416, 417, 406, 422, 423, 424

[56] References Cited

U.S. PATENT DOCUMENTS

| | | | |
|---|---|---|---|
| 4,471,653 | 9/1984 | Kawamura et al. | 123/612 X |
| 4,495,927 | 1/1985 | Yamato | 123/424 X |
| 4,519,362 | 5/1985 | Arakawa et al. | |
| 4,553,427 | 11/1985 | Kuraoka et al. | 123/414 X |
| 4,747,389 | 5/1988 | Yuzawa et al. | 123/643 |
| 4,893,244 | 1/1990 | Tang et al. | 364/431.03 |

FOREIGN PATENT DOCUMENTS

| | | |
|---|---|---|
| 0284054 | 9/1988 | European Pat. Off. |
| 57-193768 | 11/1982 | Japan |
| 60-98171 | 6/1985 | Japan |
| 60-261-978 | 12/1985 | Japan |
| 61-60256 | 12/1986 | Japan |
| 2157422 | 10/1985 | United Kingdom |

Primary Examiner—Parshotam S. Lall
Assistant Examiner—E. J. Pipala
Attorney, Agent, or Firm—Pennie & Edmonds

[57] ABSTRACT

A system and a method for detecting an engine revolution speed, identifying engine cylinders, and controlling an engine operation according to the detected engine revolution speed and identified engine cylinders in which a crank angle sensor includes a rotor plate which rotates in synchronization with a rotation of an engine crankshaft, a plurality of first slits whose number corresponds to the number of cylinders and which are mutually arranged at equal intervals along the circumferential direction of the rotor plate, and second slit, both first and second slits being aligned on the same circumferential direction, the sensor outputting a pulse train signal including a first signal corresponding to a first crank angle position before a top dead center in a compression stroke and a second signal corresponding to a second crank angle position after the top dead center in the compression stroke of a first engine cylinder and a microcomputer executes a fuel injection quantity and-/or ignition timing control on the basis of the first and second signals derived by the crank angle sensor.

15 Claims, 10 Drawing Sheets

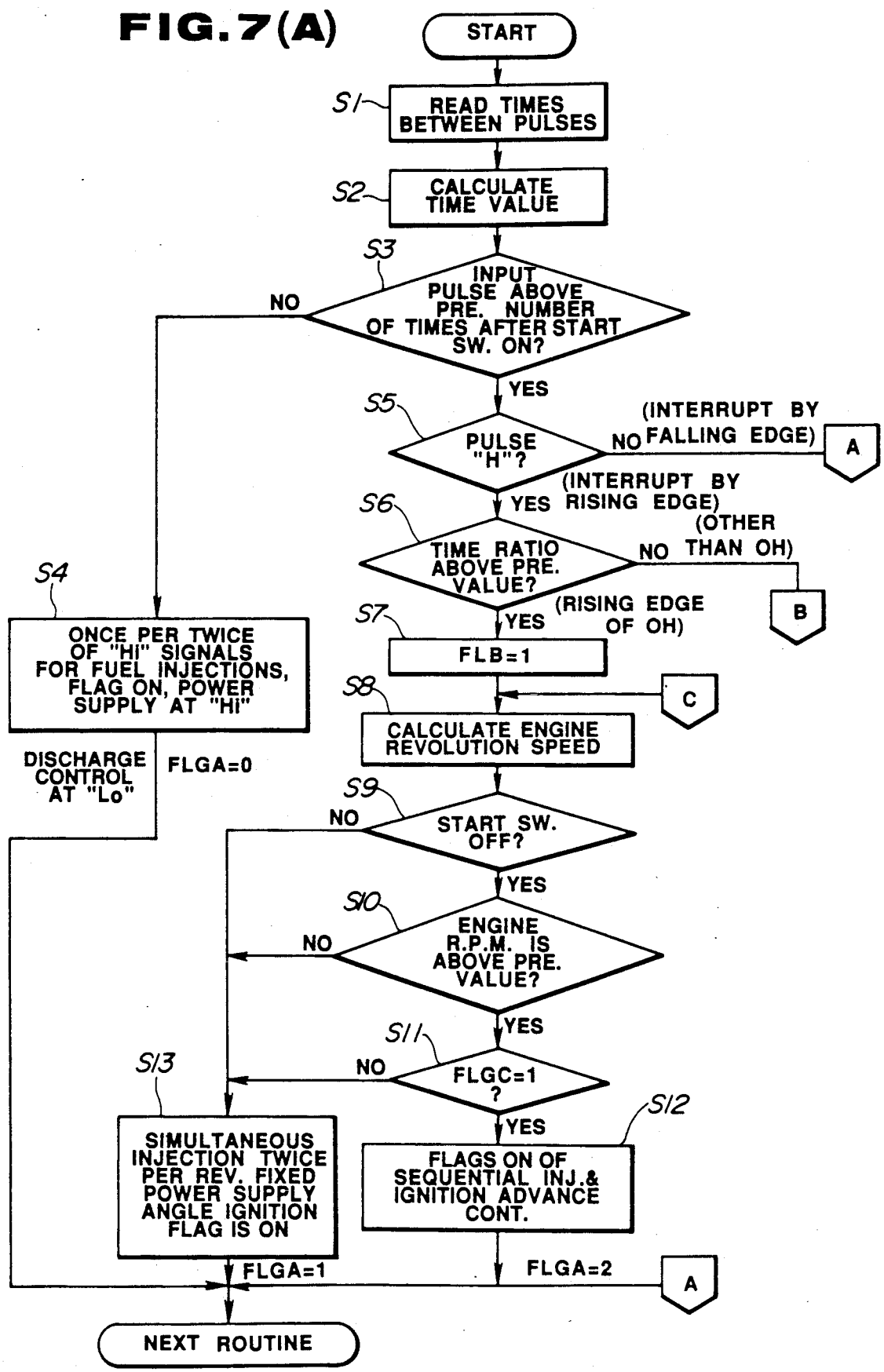

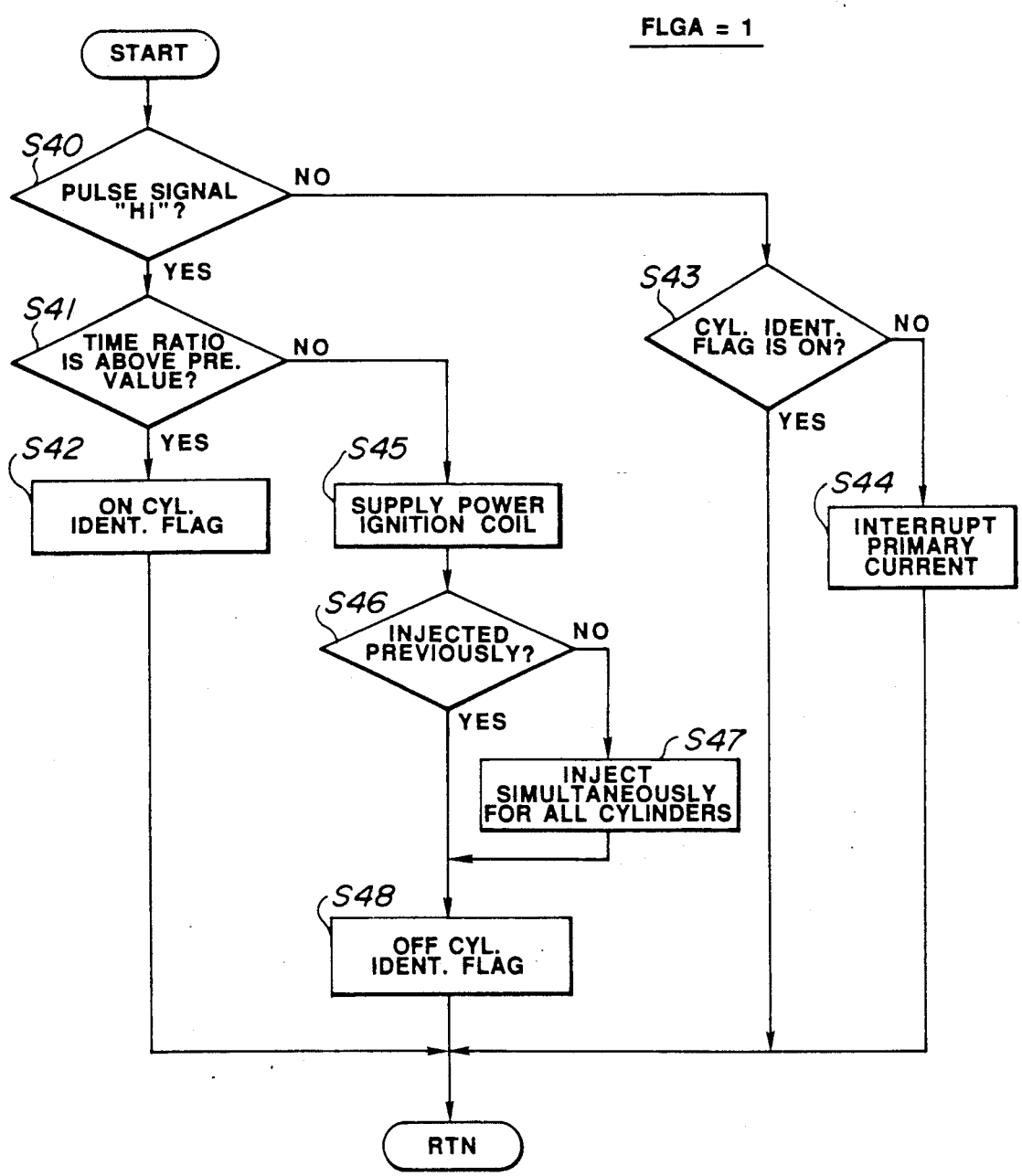

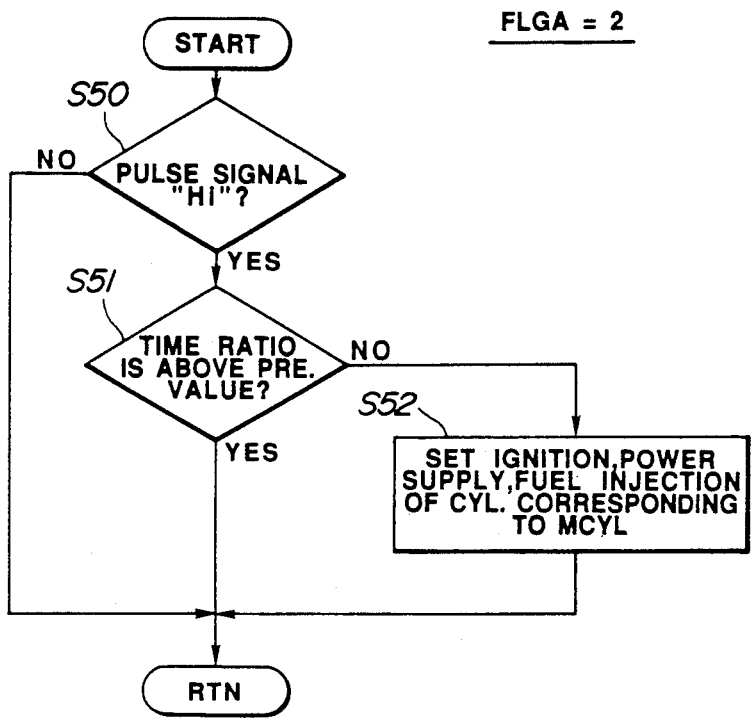
FIG.10
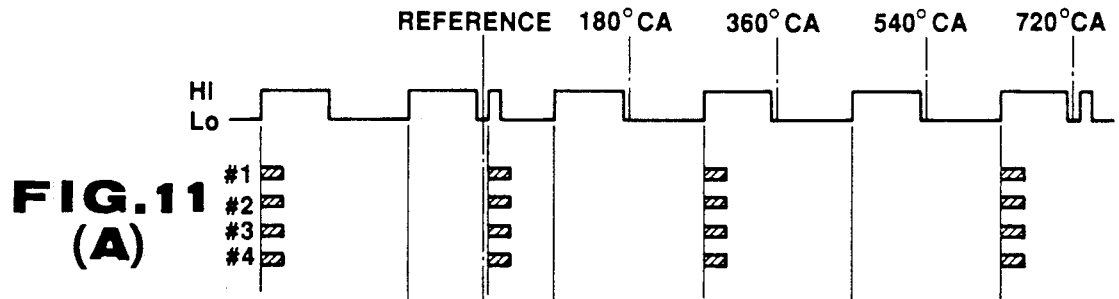
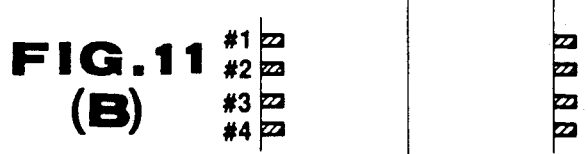
FIG.11 (A)
FIG.11 (B)
FIG.11 (C)

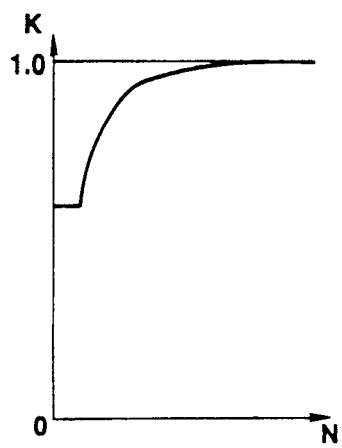
FIG.13
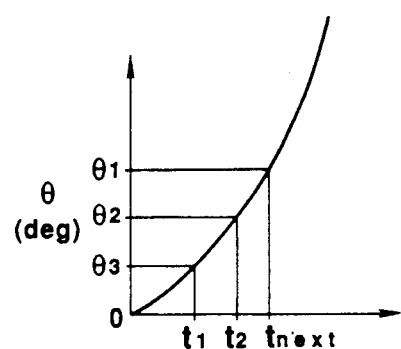
FIG.14(A)
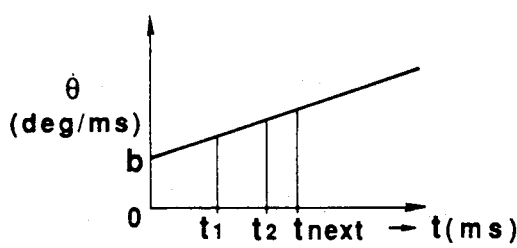
FIG.14(B)
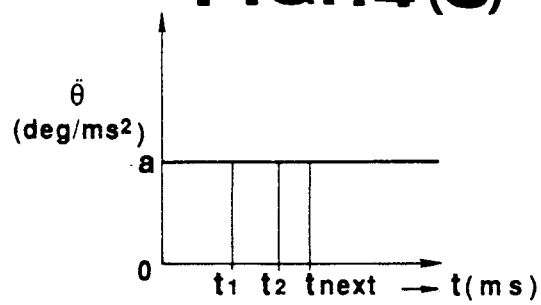
FIG.14(C)
FIG.14(D)
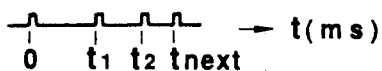
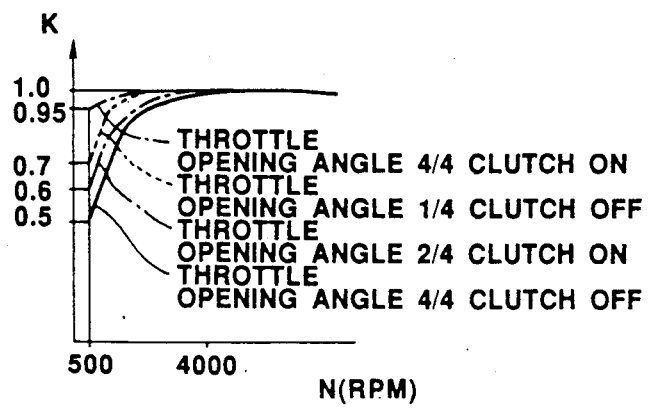
FIG.15

SYSTEM AND METHOD FOR DETECTING ENGINE REVOLUTION SPEED, IDENTIFYING ENGINE CYLINDER, AND CONTROLLING ENGINE OPERATION ACCORDING TO DETECTED ENGINE REVOLUTION SPEED AND IDENTIFIED CYLINDER

BACKGROUND OF THE INVENTION (1) Field of the invention

The present invention relates to a system and method for detecting an engine revolution speed, identifying each of cylinders, and controlling an engine operation according to the detected engine revolution speed and identified cylinder applicable to an internal combustion engine, particularly for a multi-cylinder, four-cycle, spark-ignited engine.

(2) Background of the art

In spark-ignited four-cycle internal combustion engines, various types of crank angle sensors of an electromagnetic pick-up type and of a photo-electric type using photo-electric elements have been used in a previously proposed fuel injection quantity and/or ignition timing controlling system.

One of the various types of the crank angle sensors, e.g., the photo-electric element type is exemplified by Japanese Patent Application—First Publications No. Showa 60-98171 published on June 1, 1985 and No. Showa 60-261978 published on Dec. 25, 1985.

Furthermore, the previously proposed crank angle sensor described above is also exemplified by U.S. Pat. No. 4,656,993 issued on April 14, 1987 and No. 4,747,389 issued on May 31, 1988.

The crank angle sensor disclosed in the above-identified Japanese Patent Application—First Publications is built in a spark ignition distributor and includes a plurality of first slits formed on an outer periphery of a rotor plate which revolves in synchronization with a crankshaft of the engine for detecting crank angular positions.

In addition, the crank angle sensor includes a second slit formed on an inner periphery of the rotor plate for discriminating each cylinder (cylinder number to be ignited).

Furthermore, the crank angle sensor picks up two signals (pulse trains) from the respective first and second slits and outputs the picked up signals to a microcomputer.

The microcomputer, then, carries out an ignition timing control in a fixed ignition timing mode or in a variable ignition timing control mode and fuel injection quantity control on the basis of the above-described, picked-up pulse train signals.

However, in the above-described crank angle sensor, the plurality of first and second slits are overlapped in the radial direction of the rotor plate and formed on the rotor plate. Specifically, the first slits are formed with minute lengths for the respective slits in the circumferential direction. Therefore, the manufacturing of the crank angle sensor is complex and the manufacturing operation becomes troublesome. Consequently, the cost required to manufacture such crank angle sensors becomes considerably high.

In addition, since the second slit is formed at a position of the rotor plate not related to a compression stroke top dead center position of the crankshaft, the crank angle sensor cannot discriminate one of the cylinders to be ignited during, e.g., the engine start. In this case, since the ignition is carried out on the basis of a cylinder identification signal derived from the second slit in addition to a crank angular position signal derived from the first slits, the ignition would be carried out at a time of, e.g., a suction stroke of one cylinder due to an erroneous distribution of a high surge voltage to an ignition coil.

On the other hand, a sequential injection method has been adopted in which an amount of fuel is sequentially injected at a time before the top dead center (TDC) in a compression stroke of each cylinder under a predetermined engine driving condition.

In the sequential fuel injection method, it is necessary to receive accurate information on the crank angle and cylinder identification.

Therefore, both picked-up signals of the crank angle signal and cylinder identification signal derived from the multiple number of slits installed on inner and outer peripheries of the rotor plate of the crank angle sensor are transmitted to the microcomputer. The microcomputer, then, carries out the sequential injection control during the predetermined engine driving condition on the basis of the picked-up signals and carries out, e.g., a simultaneous injection control for all cylinders during the engine start and during the engine revolution speed below a predetermined value, as exemplified by a Japanese Patent Application—Second (Examined) Publication Showa 61-60256 published on Dec. 19, 1986.

However, the crank angle sensor used in the above-described fuel injection quantity controlling system has the same drawbacks as described above.

Furthermore, a Japanese Patent Application—First Publication Showa 57-193768 published on Nov. 29, 1982 exemplifies one of the previously proposed ignition timing controlling systems.

In the previously proposed ignition timing controlling system, a correction time for the ignition timing corresponding to an angular acceleration is set to zero at a boundary of a dead zone of the acceleration/deceleration. At an outside of the dead zone, the correction time is continuously varied according to the angular acceleration with the zero being served as a base point. Therefore, a variation of an ignition timing advance angle can be suppressed which would occur in a case when the engine revolution speed becomes unstable at a time of the engine idling and the correction of the ignition timing according to the angular (crankshaft rotational) acceleration is carried out.

A controlling method in which an error of the ignition timing generated due to the angular acceleration of the crankshaft is corrected includes the steps of deriving a correction coefficient through an interpolation of a linear interpolation for each cycle and of carrying out a predetermined advance angle control on the basis of the correction coefficient.

In details, since a time it takes for the crankshaft to revolve between each reference position pulse generated from the crank angle sensor is measured and stored, a value of difference $T_d$ between the previous value $T_2$ and present value $T_1$ is calculated, and the correction coefficient is derived predicting the subsequent cycle only according to the difference value, a highly accurate ignition timing control is difficult to achieve over a wide range of acceleration from a low engine revolution speed to a high engine revolution speed.

In more details, FIGS. 1 through 3 show relationships between a target ignition timing during an idling with an accelerator pedal depressed and an actual ignition timing.

That is to say, in a case when an angular acceleration correction is not present, the actual ignition timing (broken line) is considerably retarded with respect to the target ignition timing (solid line) during the series of accelerations, as appreciated from FIG. 1.

On the other hand, in a case when the angular acceleration correction is carried out in the above-described method, the correction coefficient is selected so that the target ignition timing coincides with the actual ignition timing under the low engine revolution speed range. At this time, although the accuracy is improved as compared with no correction, the actual ignition timing (broken line) is retarded with respect to the target ignition timing (solid line) as the engine revolution speed is increased, as appreciated from FIG. 2.

In addition, in a case when the correction coefficient is selected so that the target ignition timing coincides with the actual ignition timing under the high engine revolution speed range, the actual ignition timing (broken line) is advanced with respect to the target ignition timing (solid line) under the low engine revolution speed, as appreciated from FIG. 3.

In this way, it is difficult to carry out the highly accurate ignition timing control at the time of acceleration in the case when the above-described correction coefficient is constant.

SUMMARY OF THE INVENTION

It is an object of the present invention to provide an improved system and a method for detecting and controlling an engine revolution of an internal combustion engine with a high accuracy, solving the drawbacks described in the background of the art.

The above-described object can be achieved by providing an apparatus for a multi-cylinder, spark-ignited, four-cycle engine, comprising: a) first means having a rotor plate which rotates in synchronization with a rotation of an engine crankshaft; a plurality of first slits whose number corresponds to the number of cylinders and which are mutually arranged at equal intervals along the circumferential direction; a second slit, both first and second slits being aligned on the same circumferential direction of the rotor plate, the first means outputting a pulse train signal having a first level change derived from each of the first slits and corresponding to a first crank angular position within a range of a first predetermined degree before a top dead center (TDC) in a compression stroke and having a second level change derived from the second slit and corresponding to a second angular position within a range of a second predetermined degree after a top dead center in the compression stroke; and b) second means for controlling a fuel supply quantity to the engine and/or ignition timing on the basis of the pulse train signal outputted by the first means.

The above-described object can also be achieved by providing an apparatus for a multi-cylinder, four-cycle, spark-ignited engine, comprising: a) first means, having a photo-electric sensor, a rotor plate which rotates in synchronization with an engine crankshaft rotation, a plurality of first slits whose number corresponds to the number of cylinders and which are mutually arranged at equal intervals along the circumferential direction of the rotor plate, a second slit, both first and second slits being aligned in the same circumferential direction of the rotor plate, the first means outputting a first signal indicating a crank angular position according to a passage of each first slit through the photo sensor and a second signal indicating a cylinder identification reference according to a passage of the second slit through the photo-electric sensor, each first slit being formed at a position corresponding to a crank angular position at least within 90° before the top dead center in a compression stroke and the second slit being formed at a position corresponding to the crank angular position at least within 30° after the top dead center in the compression stroke; and b) second means for carrying out at least one of a fuel injection quantity control and ignition timing control on the basis of the first and second signals derived by the first means.

The above-described object can also be achieved by providing a method of detecting an engine revolution speed and engine cylinder identification and controlling an engine operation according to the detected engine revolution and identified engine cylinder for a multi-cylinder, four-cycle, spark-ignited engine, comprising the steps of a) providing first means having; a rotor plate which rotates in synchronization with a rotation of an engine crankshaft; a plurality of first slits whose number corresponds to the number of cylinders and which are mutually arranged at equal intervals along the circumferential direction; a second slit, both first and second slits being aligned on the same circumferential direction of the rotor plate, the first means outputting a pulse train signal having a first level change derived from each of the first slits and corresponding to a first crank angular position within a range of a first predetermined degree before a top dead center (TDC) in a compression stroke and having a second level change derived from the second slit and corresponding to a second angular position within a range of a second predetermined degree after a top dead center in the compression stroke; and b) controlling a fuel supply quantity to the engine and/or ignition timing on the basis of the pulse train signal outputted in the step a).

BRIEF DESCRIPTION OF THE DRAWINGS

FIG. 9 is a flowchart in a case when FLGA=1 shown in FIGS. 7 (A) and 7 (B).

FIG. 10 is a flowchart in a case when FLGA=2 shown in FIGS. 7 (A) and 7 (B).

FIGS. 11 (A) through 11 (C) are timing charts of fuel injection timing when a cylinder identification is impossible, when an identification possibility is not so high due to a low engine revolution speed although the cylinder identification can more or less be carried out, and when the cylinder identification is possible and an identification certainty is high.

FIG. 13 is a table map used in the other preferred embodiment shown in FIG. 12.

FIGS. 14 (A) through 14 (D) are explanatory views for explaining the meaning of an angular acceleration K.

FIG. 15 is a table map storing values of the angular acceleration K which are varied according to an equivalent inertia moment caused by an opening angle of a throttle valve and/or transmission clutch off.

DETAILED DESCRIPTION OF THE PREFERRED EMBODIMENTS

Reference will hereinafter be made to the drawings in order to facilitate a better understanding of the present invention.

Figure 5:
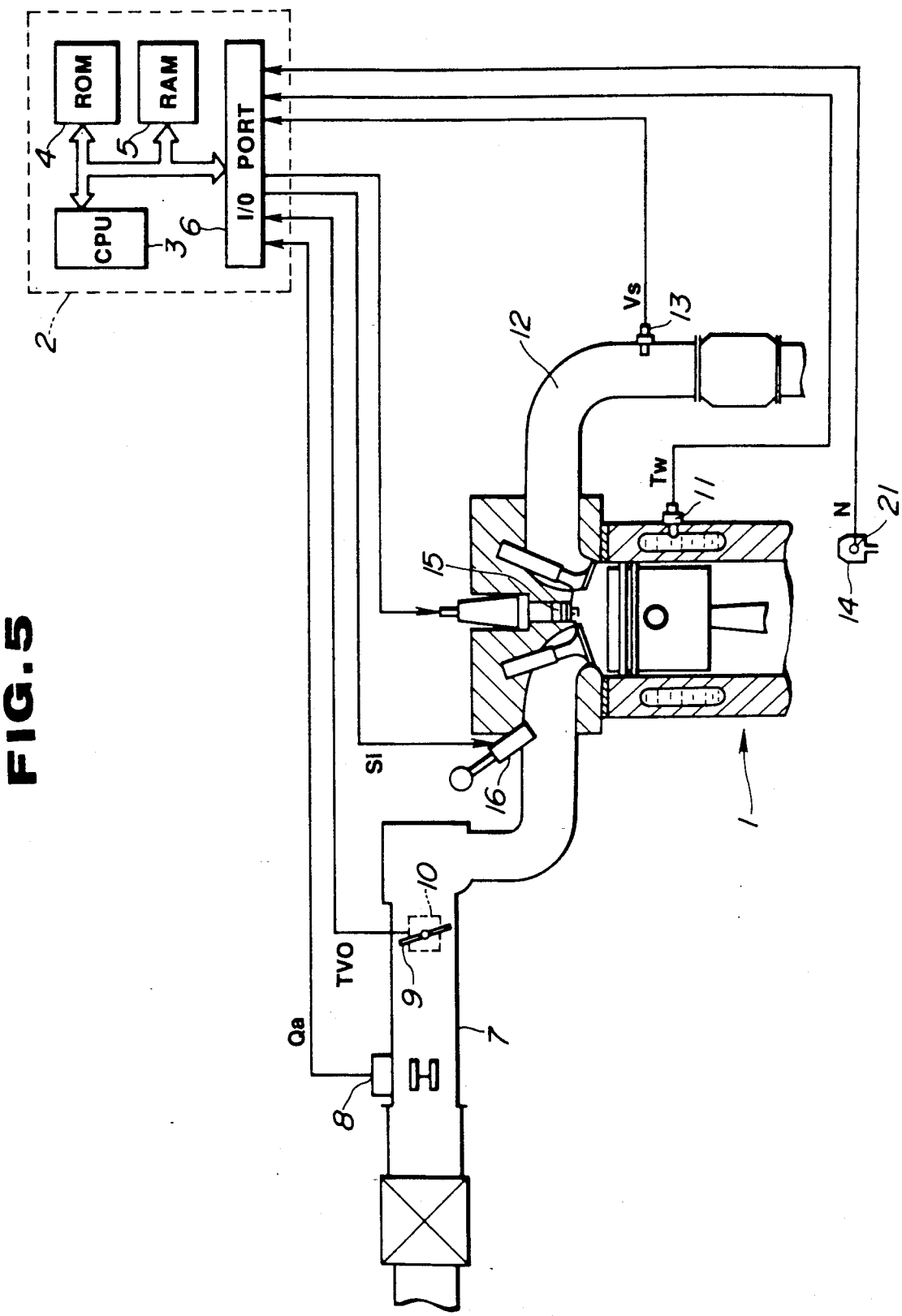
FIG. 5 is a schematic block diagram of the system for controlling the engine revolution for the internal combustion engine in a preferred embodiment according to the present invention.

FIG. 5 shows an overall configuration of a system for detecting an engine speed, identifying cylinder, and controlling an engine operation for an internal combustion engine in a preferred embodiment according to the present invention.

In FIG. 5, an engine 1 is of a four-cycle four-cylinder electronically controlled type.

A microcomputer 2 includes a CPU (Central Processing Unit) 3, ROM (Read Only Memory) 4, RAM (Random Access Memory) 5, and I/O Port 6.

The microcomputer 2 receives an intake quantity signal Qa derived from an airflow meter 8 installed in an air-intake pipe 7, an opening angle quantity signal TVO derived from an opening angle detecting sensor 10 installed in a throttle valve 9, a coolant temperature signal Tw derived from a coolant temperature sensor 11, a reference voltage signal Vs derived from an Oxygen ($O_2$) sensor 13 installed in an exhaust pipe 12, and an engine revolution speed signal N derived from a crank angle sensor of a photo-electric type incorporated into a distributor 14.

Then, the microcomputer 2 detects a present engine driving condition, executes an optimum ignition timing control and outputs the ignition signal to one of ignition plugs 15 installed in respective cylinders, and executes a fuel injection quantity control and outputs a fuel injection signal to a fuel injection valve 16.

Figure 1:
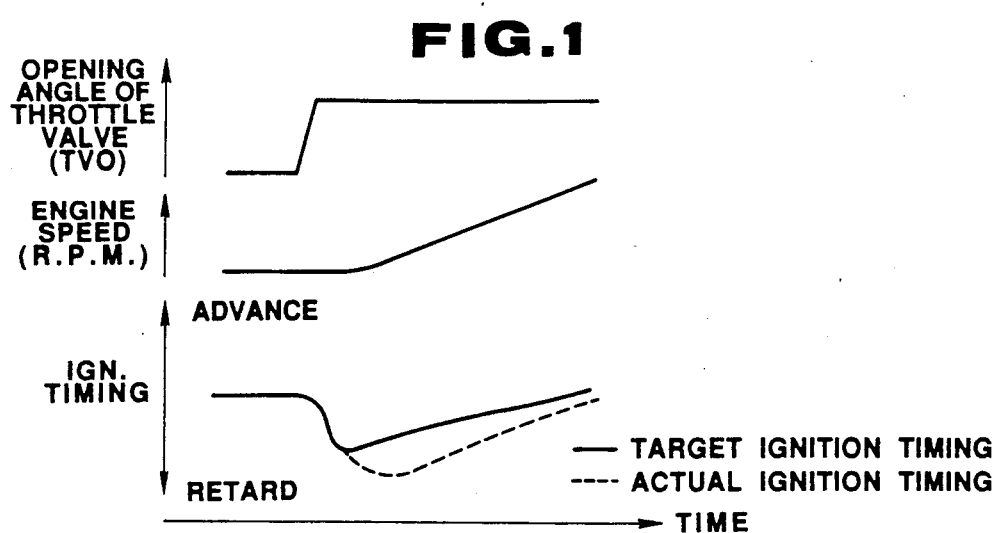
FIGS. 1 through 3 are characteristic graphs of relationships between target ignition timings and actual ignition timings in a previously proposed ignition timing controlling system for an internal engine combustion engine.
Figure 2:
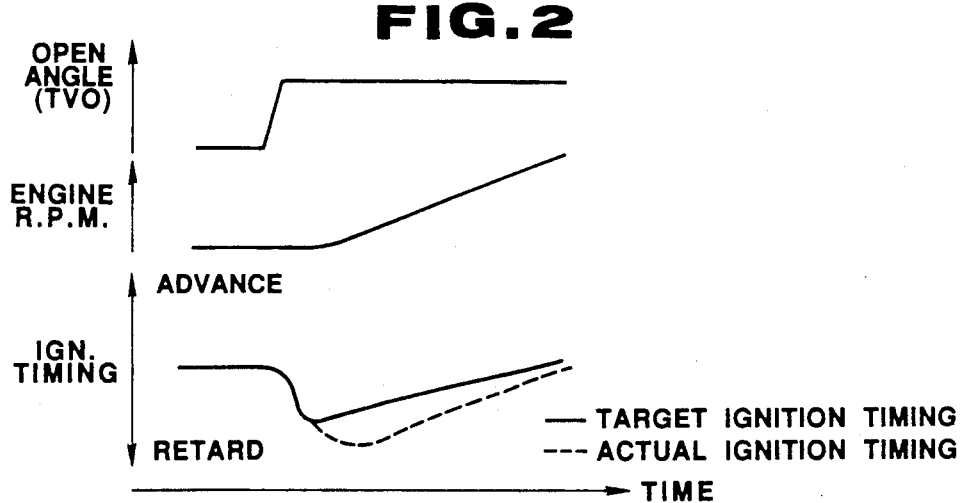
Figure 3:
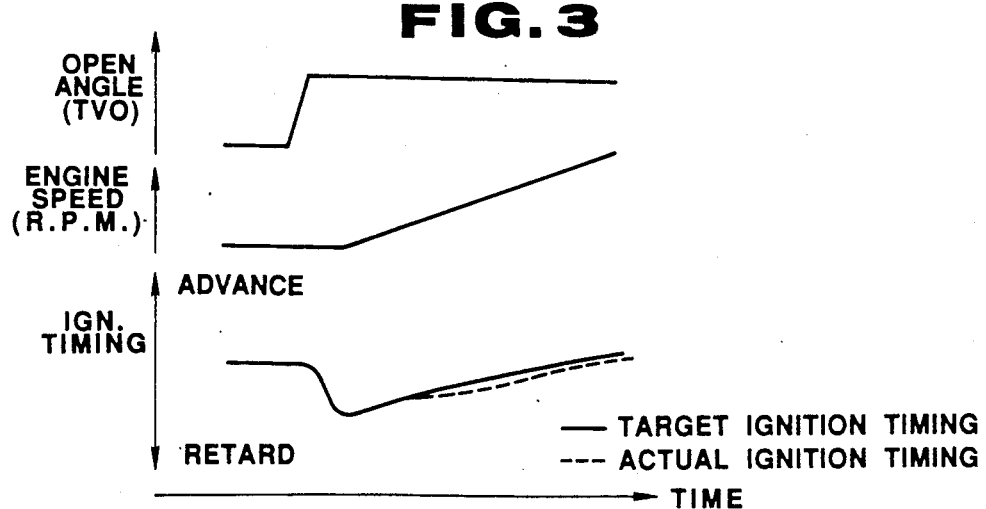
Figure 4:
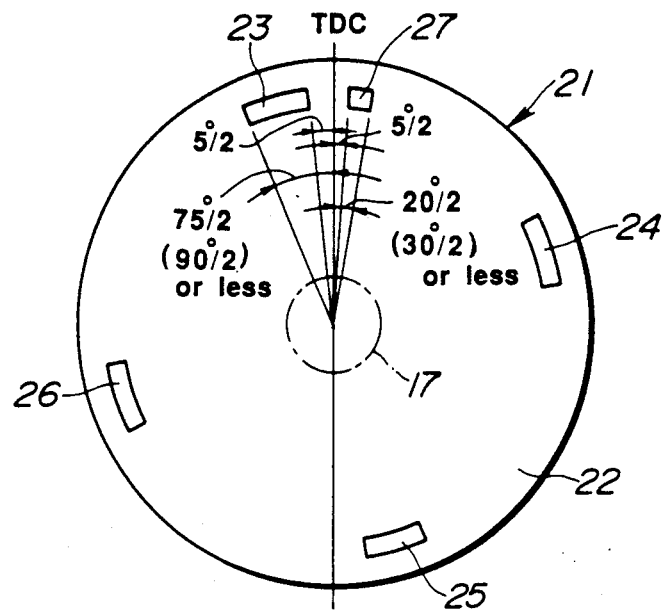
FIG. 4 is a schematic expanded view of a crank angle sensor applicable to a system and method for detecting and controlling engine revolution speed for an internal combustion engine according to the present invention.

FIG. 4 shows the structure of the crank angle sensor 21.

As shown in FIG. 4, the crank angle sensor 21 includes a rotor plate 22 connected to a disc shaft 17, a light emitting diode (LED) (not shown) and light receiving diode (LRD) (not shown) set on the rotor plate 22, and signal processing portion.

The above-described rotor plate 22 includes four slits 23, 24, 25, and 26 corresponding to first, second, third, and fourth cylinders and a single cylinder identification reference signal slit 27 on the same circumference.

The above-described four slits 23, 24, 25, and 26 are set so as to have the same length in the circumferential direction and are disposed symmetrically with the disc shaft as a center, i.e., at equal spatial intervals of 90° (180° crank angle).

Figure 6:
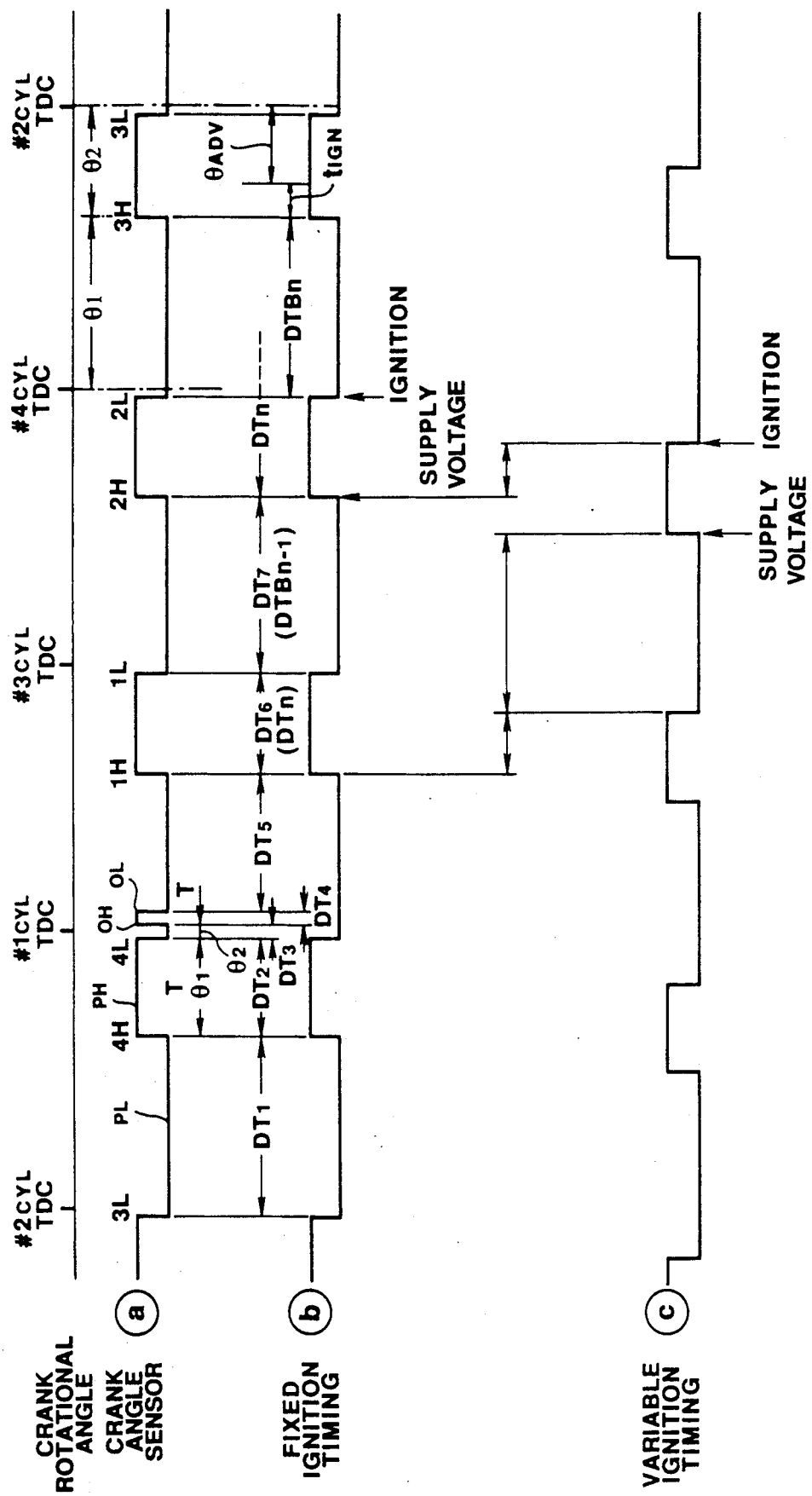
FIG. 6 is a waveform chart of pulse signals in the preferred embodiment shown in FIG. 5.

In addition, each length of the slits 24 through 26 is set, as shown in a of FIG. 6, such that the corresponding pulse signal rises in a vicinity of 70° CA (crank angle) before a top dead center (TDC) in a compression stroke of the crank rotational angle and falls in a vicinity to about 5° before TDC.

On the other hand, a length of the reference signal slit in the circumferential direction for cylinder identification is set so as to become shorter than the length of each slit 23, 24, 25, and 26.

The reference signal slit 27 is disposed within about 30° after the top dead center (TDC) in the vicinity of the first cylinder slit 23. Then, an H level edge, the rising edge of the pulse signal derived from the reference slit 27, is set at the position about 5° CA after the TDC.

The light passing through each slit 23, 24, 25, and 26 causes an 180° CA signal of the crank angle, as shown in a of FIG. 6, and an ON-OFF pulse signal of a cylinder identification reference signal to be generated and output to the microcomputer 2.

The microcomputer 2 receives each pulse signal, measures the time duration between the 180° crank angle signal (CA) to derive the engine revolution signal N; carries out a variable ignition timing control on the basis of a previously stored ignition timing value data derived from a function between the engine revolution speed N and the intake air quantity signal Qa from the airflow meter 8 (refer to c of FIG. 6); and carries out a fixed ignition timing control according to the engine revolution speed N and not using the above-described ignition timing value data when the engine is in the idling condition and in the deceleration state (refer to b of FIG. 6).

It is noted that a width of the H (high) level of the 180° CA pulse signal is 70° CA and a width of the L (low) level thereof is 110° CA. It is also noted that a power supply duration in the above-described fixed ignition timing control is the same as the above-described 180° CA pulsewidth and the ignition timing is the same timing as the L level edge. On the other hand, the power supply duration in the variable ignition timing control is derived with the power supply duration stored in the microcomputer 2 calculated into a power supply angle and the ignition timing is set to an advance angle timing of a predetermined angle with the H level of the 180° CA as a reference.

The microcomputer 2, in addition, carries out the fuel injection control, i.e., fuel injection simultaneously for all cylinders on the basis of the crank angular position detecting signal, e.g. at the time of the engine start, according to the engine driving condition. On the other hand, under a predetermined driving condition, a so-called sequential injection is carried out in which fuel is injected sequentially before TDC (in the compression stroke) of each cylinder on the basis of the crank angular position detecting signal and cylinder identification signal.

Figure 7B:
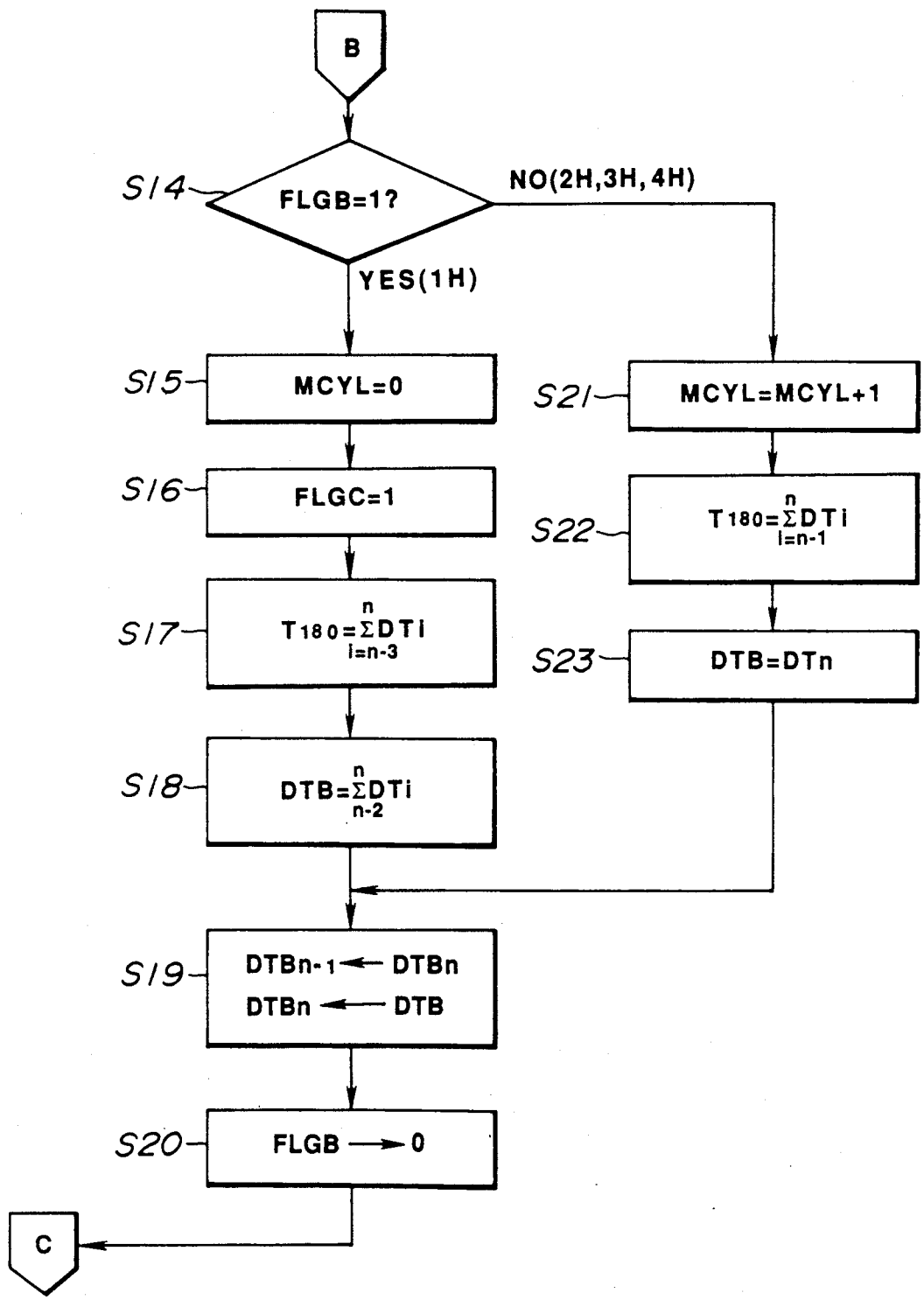
FIGS. 7 (A) and 7 (B) are an integral flowchart of a basic control executed by a microcomputer shown in FIG. 5.

FIGS. 7 (A) and 7 (B) show an integral flowchart of a basic control executed in the microcomputer 2.

A basic routine shown in FIGS. 7 (A) and 7 (B) is interrupted on a rising edge and falling edge of the pulse signal outputted from the crank angle sensor 21.

In a step S1, the microcomputer (CPU 3) 2 reads the time duration between each pulse signal ($DT_l$ through $DT_n$ of FIG. 6). In a step S2, the CPU 3 derives a time ratio (DDT) from such an equation as $DT_{n-1}/DT_n$.

Next, in a step S3, the CPU 3 determines whether the input pulse is above the predetermined number of times after the start switch is turned to ON.

At this time, if NO in the step S3, i.e., if the input pulse number of times is below the two crankshaft revolutions and below five pulse generations, the routine goes to a step S4 since no determination is carried out.

In the step S4, a flag (FLG) is risen indicating that, as shown in FIG. (A) of FIG. 11, the fuel injection is once per twice of the H level signals and the ignition is power supplied at the H level signal and discharged at the L level. Then, the routine goes to the subsequent routine (FLGA=0).

On the other hand, if YES in the above-described step S3, the routine goes to a step S5 in which the CPU 3 determines whether the pulse signal is at the H level.

If not H level in the step S5, the routine goes to a subsequent routine in response to an interrupt caused by a rising edge.

If H level is determined in the step S5, the routine goes to a step S6 in which the CPU 3 determines whether the time ratio calculated in the step S2 is above a predetermined value.

That is to say, in the step S6, the CPU 3 determines whether a ratio between the present L level angle $\theta_1$ and previous H level angle $\theta_2$ i.e., $\theta_1/\theta_2$ (refer to FIG. 6) is larger than, e.g., 3.

It is noted that the reason for "above 3" is that it is a value in a range where a resolution of a pulsewidth can be exhibited and in which a fixed advance angle range (5° CA through 10° CA) of the ignition timing can be achieved.

If in the step S6 the CPU 3 determines that the ratio $\theta_1/\theta_2$ is above 3 (in a case where once high level edge (OH) of cylinder identification reference signal per five times), the routine goes to a step S7 in which a FLGB is risen to 1 indicative of the cylinder identification signal to recognize merely the cylinder number.

In a step S8, the CPU 3 calculates the normal engine revolution speed N using the equation of N=60/2 X $T_{180}$ from the measurement time $T_{180}$ between 180° CA as will be described later.

Next, in a step S9, the CPU 3 determines whether a start switch is turned OFF. If the start switch is turned OFF, the routine goes to a step S10 in which the CPU 3 determines whether the engine revolution speed N is, e.g., 400 R.P.M.. If N is above 400 R.P.M., the routine goes to a step S11 in which the CPU 3 determines whether a flag FLGC has indicated 1. In other words, in these steps, the CPU 3 determines whether all conditions of the start switch and engine revolution speed satisfy possible conditions of the sequential control.

If YES in the step S11, the routine goes to a step S12 in which the CPU rises a flag FLGA (=2) indicating that, as shown in (C) of FIG. 11, the sequential control and ignition advance angle are executed and the routine goes to a subsequent routine to be described later.

On the other hand, if the answer of any one of the steps of S9, S10, and S11 is NO, the routine goes to a step S13 in which the CPU 3 rises a flag indicating that, as shown in (B) of FIG. 11, twice simultaneous fuel injections per crankshaft rotation, fixed power supply angle, and ignition control are executed and the routine goes to a subsequent routine (FLGA=1).

On the other hand, if NO is the answer in the step S6 (except OH of the cylinder identification reference signal), the routine goes to a step S14 in which the CPU 3 determines whether the flag FLGB is turned to 1. In other words, the CPU 3 determines whether the cylinder identification signal has risen. If YES in the step S14, the routine goes to a step S15 in which an M cylinder (CYL) is set to 0 to place a reference thereon. It is noted that the MCYL is a variable using 0, 1, 2, and 3 and corresponds to an order of ignition and fuel injection and, in the case of the four-cylinder engine, the MCYL corresponds to the crank angle of 75° CA before the bottom dead center in an explosion stroke through 105° after the lower top dead center in the explosion stroke of, e.g., each of first cylinder when 0, third cylinder when 1, fourth cylinder when 2, and second cylinder when 3. Then, when FLGB=1, MCYL is set to 0.

In a step S16, FLGC is set to 1. In a step S17, the CPU 3 measures the time $T_{180}$ between 180° CA by $$\sum_{i=n-3}^{n} DT_i$$

as a factor deriving the engine revolution speed N as described above.

In the step S16, the CPU 3 measures $T_{180}$ by adding four times of $DT_2+DT_3+DT_4+DT_5$ since MCYL=0 in the step S15.

In a step S18, the CPU 3 measures the time duration DTB between L levels which serve as a reference of the ignition timing (110° CA). In this case, since the cylinder identification reference signal 27 is present, the CPU 3 measures $$\sum_{i=n-2}^{n} DT_i$$

including the cylinder identification reference signal 27. That is to say, the CPU measures DTB by adding three times of $DT_3+DT_4+DT_5$.

In a step S19, the CPU 3 measures and stores a new reference value by sequentially updating the time DTB between 110°$\theta$ CA. This is used to calculate the angular acceleration.

Next, in a step S20, the CPU 3 turns the FLGB to 0. When FLGB is 0, it indicates that the cylinder identification reference signal 27 is not risen. At this time, since MCYL=0 in the step S15, the CPU recognizes that the third cylinder when 0+1, the fourth cylinder when 0+2—. Then the routine goes to the step S8 and the same process is executed as described above.

In a case where FLGB $\neq$1 in the step S14, the cylinder identification signal 27 is not risen. Hence, in a step S 21, the CPU 3 executes a processing in such a way that MCYL is incremented by one. In the next step S22, the CPU 3 measures the time between 180° CA using the equation of $$\sum_{i=n-1}^{n} DT_1.$$

Next, in a step S23, the CPU 3 measures the time duration DTB between 110°$\theta$ CA and the routine goes to the step S19.

Figure 8:
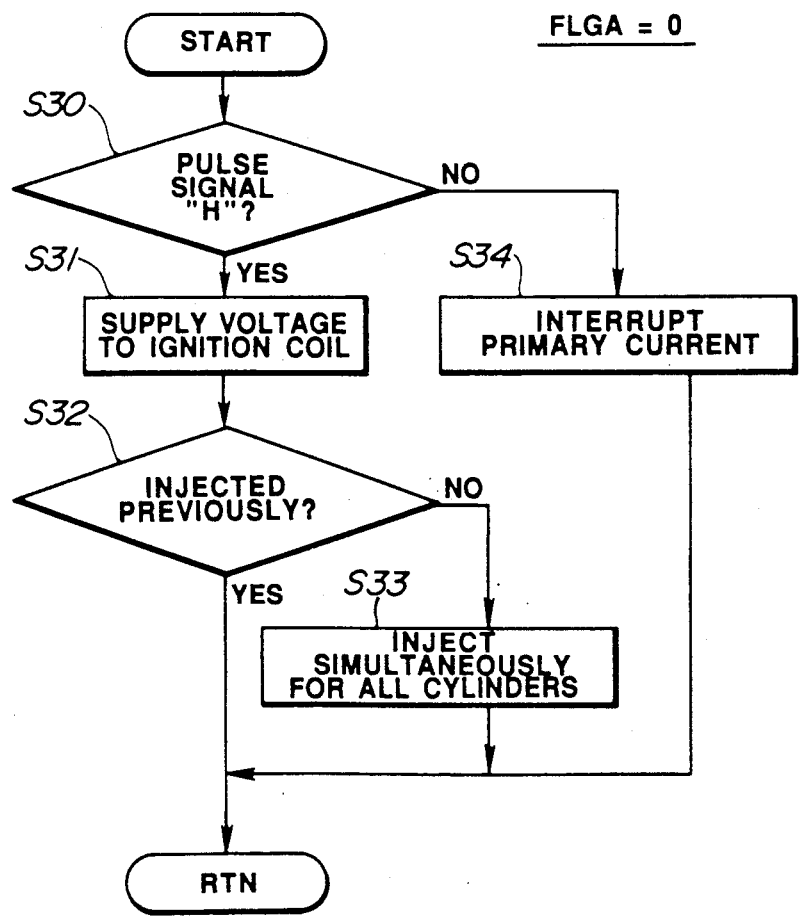
FIG. 8 is a flowchart in a case when FLGA=0 shown in FIGS. 7 (A) and 7 (B).

The routines of FLGA=0, FLGA=1, and FLGA=2 will be explained as follows:

The routine from the step S4 in the case of FLGA=0 is shown in FIG. 8.

In a step S 30, the CPU 3 determines again whether the pulse signal is at the H level. If YES in the step 30, the routine goes to a step S31 in which the power is supplied to a primary side of an ignition coil at a time in a vicinity to about 75° CA before the top dead center (TDC) in the compression stroke.

In a step S 32, the CPU 3 determines whether the fuel injection is carried out in response to a previous pulse H level signal. If YES in the step S32, nothing is carried out and the routine returns directly.

If NO in the step S 32, the routine goes to a step S 33 in which the simultaneous fuel injection for all cylinders is carried out at a rate of once per twice of the H level signals.

Then, if the CPU 3 determines that the pulse signal is at the L level in the step S 30, the routine goes to a step S34 in which a current passing through a primary side of the ignition coil is interrupted. That is to say, the ignition is carried out at the crank angle in the vicinity to about 5° CA before the top dead center (TDC) in the compression stroke and the routine returns.

It is noted that although the ignition is carried out during the generation of the cylinder identification signal as well as the above-described crank angle position signal, a good combustion action is achieved since the cylinder identification reference signal is generated at 5° CA after the top dead center in the compression stroke, the ignition is carried out immediately after the compression stroke.

FIG. 9 shows the control routine in which in the routine of FLGA=1 subsequent to a step S 13, the cylinder identification has already been carried out and the driving condition is in the engine start.

In a step S 40, the CPU 3 determines whether the pulse signal is in the H level state. If the pulse signal is at the H level, the routine goes to a step S 41 in which the time ratio is above a predetermined value, i.e., above "3".

When the CPU 3 determines whether the time ratio exceeds three in a step S40, the CPU 3 rises a flag indicating the cylinder identification and the routine returns directly.

If NO in a step S 40, i.e., the pulse signal is at the low L level, the routine goes to a step S 43 in which the CPU 3 determines whether the cylinder identification flag is turned ON. If the flag rises in the step S 43, the routine directly returns.

If no flag risen, the routine goes to a step S 44 in which a current passing through the primary winding of the ignition coil is interrupted and the ignition is started on the basis of the fixed ignition timing control. On the other hand, if the time ratio is below "3", e.g., the routine becomes the H level of the pulse signal except the cylinder identification reference signal. At this time, the routine goes to a step S 45 in which the power is supplied to the primary winding of the ignition coil. In the next step S46, the CPU 3 determines whether the fuel injection is carried out at the previous H level. If YES in the step S 46, the CPU 3 determines whether the fuel is injected at the previous H level. If YES in the step S 46, the routine goes to a step S 48. If NO in the step S 46, the twice all cylinder simultaneous fuel injections are carried out per crankshaft rotation and the routine goes to a step S 48.

In the step S 48, the CPU 3 executes the processing in which the cylinder identification flag falls.

FIG. 10 shows the control routine of FLGA (=2) subsequent to the step S 12.

As shown in FIG. 10, the CPU 3 determines whether the pulse signal is at the H level in a step S 50. If NO in the step S 50, the CPU 3 directly returns.

If YES in the step S 50, the routine goes to a step S 51 in which the CPU 3 determines whether the time ratio is above "3".

If YES in the step S 51, the pulse signal is cleared. If NO in the step S 51, the routine goes to a step S 52 in which the ignition/power supply is carried out by means of the variable ignition control for each cylinder corresponding to MCYL on the basis of the sequential control and in which the fuel injection is carried out for the respective cylinders. Then, the routine directly returns.

Although the above-described preferred embodiment is applied to the four-cylinder engine, the present invention is applicable to any number of cylinder engines.

Figure 12:
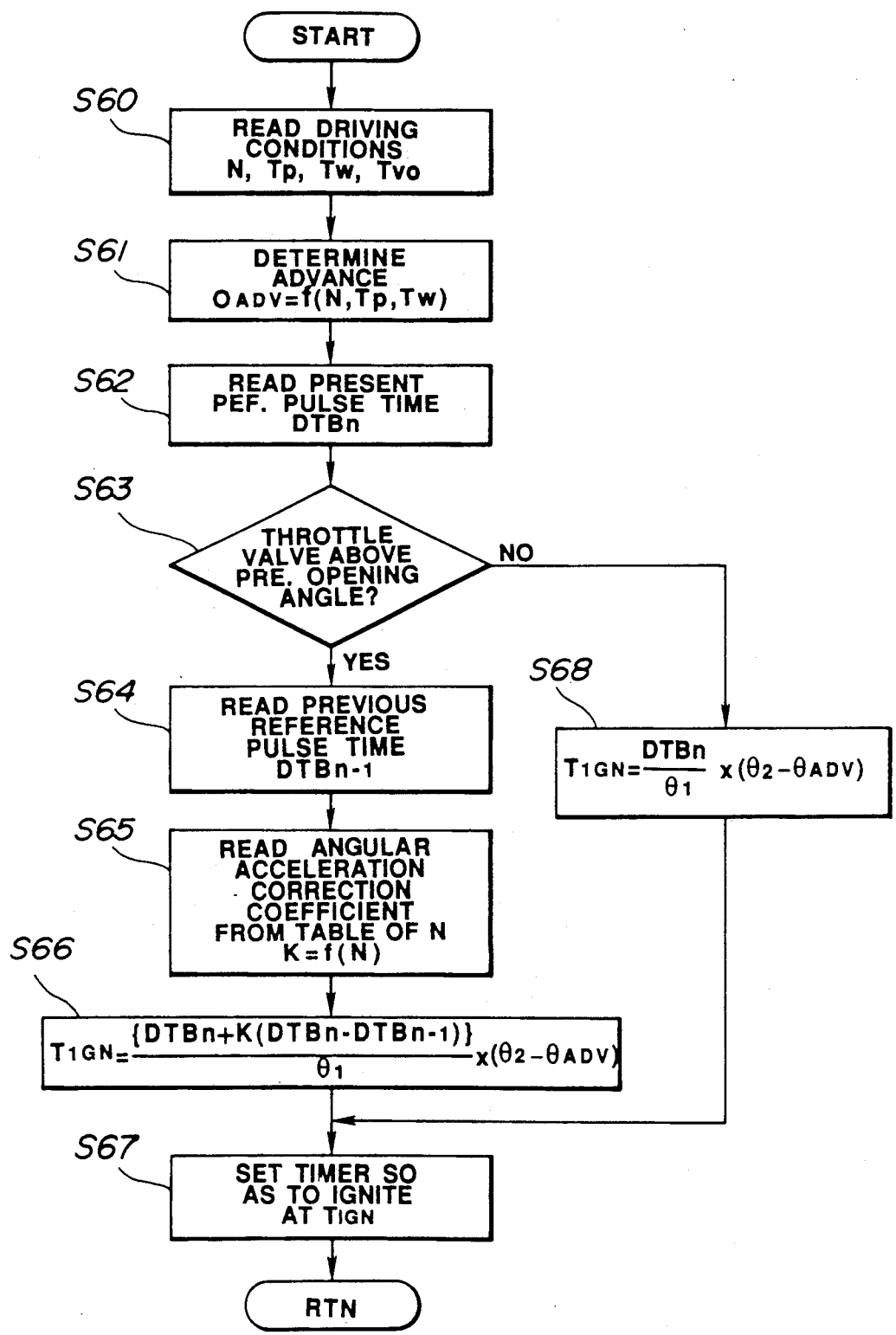
FIG. 12 is an operational flowchart of an ignition timing correction control in another preferred embodiment according to the present invention.

Next, FIG. 12 shows an operational flowchart of the ignition timing correction control of the above-described angular acceleration.

In a step S 60, the CPU 3 reads the engine revolution speed N, basic fuel injection quantity $T_p$, engine coolant temperature $T_w$, and throttle opening angle quantity TVO.

In the next step S 61, the CPU 3 determines a predetermined ignition advance angle value ($\theta_{ADV}$) from the TDC using the above-described ignition timing advance angle value data derived from the functions of N, $T_p$, and $T_w$.

In a step S 62, the CPU 3 reads the pulse duration $DTB_n$ between the present 110° $\theta_l$, as shown in (a) of FIG. 6.

In a step S 63, the CPU 3 the CPU 3 determines whether the opening angle quantity TVO of the throttle valve is above the predetermined value.

When, YES in the step S 63, i.e., the CPU 3 determines whether the opening angle quantity is above the idling revolution speed, the routine goes to a step S 64 in which the CPU 3 reads the previous time $DTB_{n-1}$ between the previous angle of 110° CA and the routine goes to a step S 65. In a step S 65, the CPU 3 reads the angular acceleration correction coefficient K from a table map shown in FIG. 13 which is previously derived from a function of the engine revolution speed N.

Next, in a step S 66, the CPU 3 calculates the ignition power supply time $t_{IGN}$ from the following equation:

$$t_{IGN} = \{DTB_n + K(DTB_n - DTB_{n-1})\}/\theta_1 \times (\theta_2 - \theta_{ADV}) - X$$

It is noted that $\theta_2$ denotes an angle of 75° from, e.g., 3H level edge of the ON pulse signal after $\theta_1$ to the TDC of #2CYL. In a step S 67, the timer is set so as to ignite fuel through the ignition plug 15 after the power supply duration ($t_{IGN}$) corrected as described above.

On the other hand, if, in the step S 63, the CPU 3 determines that the opening angle is below the throttle opening angle quantity (TVO), the power supply duration is derived in the following equation:

$$t_{IGN} = DTB_n/\theta_1 \times (\theta_2 - \theta_{ADV}).$$

That is to say, if the engine revolution speed is below the idling engine revolution speed, the correction coefficient K is set to zero and the ignition timing correction due to the angular acceleration is not carried out. Therefore, $t_{IGN}$ is set on the basis of the fixed ignition timing control.

The meaning of the above-described angular acceleration correction coefficient K and its setting method will be described with reference to FIGS. 14 (A) through 14 (D) and FIG. 15.

That is to say, in a case where the engine revolution speed is constant, it is apparent that the angular acceleration correction is not needed. As the variation of the revolution speed becomes larger, the more correction is needed.

Suppose a case where an abrupt acceleration of the engine is carried out with the throttle valve 9 fully open in which the variation of the rotational speed becomes maximum.

A generation torque of the engine when the throttle valve 9 is fully open is substantially the same irrespective of the engine revolution speed. Therefore, the angular acceleration $\theta$ of the engine becomes substantially constant as shown in FIG. 14 (C).

Consequently, the engine revolution speed $\theta$ which is a first-order integration of the angular acceleration $\theta$ indicates a liner function as shown in FIG. 14 (B). The engine revolution position $\theta$ which is a second-order integration of the angular acceleration $\theta$ indicates a quadratic function as shown in FIG. 14 (A).

The following general formula can represent the value of $\theta$ since $\theta$ denotes the quadratic function of the time t.

$$\theta = \tfrac{1}{2}at^2 + bt + c \qquad (i)$$

In addition, if the subsequent change in the state is considered with $\theta = \theta_o$ taken into account, the equation (i) can be changed as follows:

$$\theta = \tfrac{1}{2}at^2 + bt \qquad (ii)$$

The crank angle reference signal is generated at $\theta_1$, $\theta_2$, and $\theta_3$ for each a predetermined angular width $\theta_d$ (e.g., 180°). Then, suppose that their corresponding times are $t_1, t_2, t_3, \ldots, t_n$.

$$\tfrac{1}{2}at_1^2 + bt_1 - \theta_d = 0 \qquad (iii)$$

$$\tfrac{1}{2}at_2^2 + bt_2 - 2\cdot\theta_d = 0 \qquad (iv)$$

$$\tfrac{1}{2}at_n^2 + bt_n - 3\cdot\theta_d = 0 \qquad (v)$$

Suppose that $t_2$ is derived from the equation (iv), $t_n$ is derived from the equation (v), and its difference $t_n - t_2$, i.e., a time from the time $t_2$ to a time at which the subsequent crank angle reference signal is generated is derived as follows:

$$t_n - t_2 = \left(-\sqrt{b^2 + 4a\cdot\theta_d} + \sqrt{b^2 + 6\cdot a\cdot\theta_d}\right)/2 \qquad (vi)$$

On the other hand, if the above-described correction equation x is substituted for the above-described equation (vi), the following equation is established:

$$t_n - t_2 = (t_2 - t_1) + K\{(t_2 - t_1) - (t_1 - t_0)\} \qquad (vii)$$

When the derived $t_1$ and $t_2$ in the equations (ii) and (iv) are substituted from the right side of the equation (vii), the K is derived as follows with right side of the equation (vi) = right side of the equation (vii).

$$K = \frac{\sqrt{b^2 + 2a\cdot\theta_d} + \sqrt{b^2 + 6a\cdot\theta_d} - 2\sqrt{b^2 + 4a\cdot\theta_d}}{b + \sqrt{b^2 + 4a\theta_d} - 2\sqrt{b^2 + 2a\theta_d}} \qquad (viii)$$

In the equation of (viii), a denotes the angular acceleration and is substantially constant, b denotes an engine revolution speed changing with time, and $\theta_d$ denotes a predetermined value.

If K is derived substituting a, b, $\theta_d$ respectively into the equation of (viii), characteristic curves of K are obtained as shown by solid lines of FIG. 15.

The value of K in the case of the low engine revolution speed becomes smaller as compared with the case when the engine revolution speed is at the low speed. Therefore, the correction coefficient K is dependent on the engine revolution speed.

In this way, if the value of K is stored in the table map shown in FIG. 15, the correction of the ignition timing with the high accuracy can be carried out in a short time over the range from the low engine revolution speed to the high engine revolution speed using the equation (vii) and the equation X during the engine driving condition.

It is noted that the table map is prepared according to the engine output such as an opening angle of the throttle valve or fuel injection quantity, as shown in FIG. 15, or alternatively different values may be selected according to equivalent inertia moment of an on and off (engagement and disengagement) of a transmission clutch.

In this way, since the correction coefficient K is derived from the function of the engine revolution speed N, an error of the ignition timing caused by the angular acceleration can appropriately be suppressed. In addition, since the slits 23 through 26 corresponding to the number of cylinders and the single cylinder identification reference signal slit 27 are disposed on the same circumference of the rotor plate 22 of the crank angle sensor, the structure of the rotor plate 22 can be simplified.

Furthermore, since the cylinder identification reference signal slit 27 is formed within 30° after the top dead center in the compression stroke, the ignition is always carried out at the crank angle before the top dead center in the compression stroke and immediately after the top dead center.

Hence, the situation in which the ignition is carried out at the suction stroke can be avoided.

In addition since the all-cylinder, is simultaneously fuel injected at a rate of twice ON signals derived from the crank angle sensor per one ON signal when the engine falls under the driving condition in which no cylinder identification cannot be carried out, the engine start characteristic is improved and stability of the engine revolutions after the engine start can be achieved.

It will be appreciated by those skilled in the art that the foregoing description is made in terms of the preferred embodiments and various changes and modifications may be made without departing from the scope of the present invention which is to be defined by the appended claims.

What is claimed is:

1. An apparatus for a multi-cylinder, four-cycle, spark-ignited engine, comprising:
   a) first means comprising:
      a rotor plate which rotates in synchronization with a rotation of an engine crankshaft;

a plurality of first slits whose number corresponds to the number of cylinders, said first slits being equally spaced along a circumferential direction of the rotor plate, and each slit forming a first predetermined degree of arc along the circumferential direction, the first predetermined degree of arc being equal among the first slits; and a second slit formed between two of the first slits, said second slit having a second predetermined degree of arc along the circumferential direction, which is smaller than the first predetermined arc, wherein the first slits and the second slit being aligned on the same radial length from a center of rotation of the rotor plate, the first means outputting a pulse train signal having a first level change derived from each of the first slits and corresponding to a first crank angular position within a range of a first predetermined degree before a top dead center TDC in a compression stroke and having a second level change derived from the second slit and corresponding to a second angular position within a range of a second predetermined degree after the top dead center in the compression stroke; and b) second means for controlling at least one of a fuel supply quantity control to the engine and ignition timing control on the basis of the first and second signals outputted by the first means.

2. An apparatus as set forth in claim 1, wherein the second means comprises:

c) third means for measuring a time duration whenever the level change of the pulse train signal occurs to derive an engine revolution speed;

d) fourth means for calculating a time ratio between time durations for the pulse train signal to be previously in ON state and to be presently in OFF state;

e) fifth means for determining at least whether the engine revolution speed is above a predetermined speed value and the time ratio is above a predetermined time ratio value and identifying any one of the cylinders when the engine revolution speed is above the predetermined speed value and the time ratio is above the predetermined time ratio; and f) sixth means for carrying out simultaneous supply of fuel to all cylinders at a rate once per twice the ON state of the pulse train signal when the engine driving condition is such that the cylinder identification by the fifth means is impossible.

3. An apparatus as set forth in claim 2, wherein the second means further includes:

g) seventh means for calculating a difference between time measurement values between a range of the present and previous predetermined crank angles and between a range of the previous and subsequently previous predetermined angles;

h) eighth means for deriving the present engine driving condition and calculating an ignition timing advance angle according to the present engine driving condition;

i) ninth means for determining an angular acceleration correction coefficient as a function of the engine revolution speed; and j) tenth means for carrying out an ignition timing correction during the acceleration at the time of engine acceleration from the difference value, ignition advance angle value, and angular acceleration correction coefficient.

4. An apparatus as set forth in claim 1, wherein the first predetermined degree is 90° CA (crank angle) and the second predetermined degree is 30° CA (crank angle).

5. An apparatus for a multi-cylinder, four-cycle, spark-ignited engine, comprising:

a) first means comprising:
a photo-electric sensor;
a rotor plate which rotates in synchronization with a rotation of an engine crankshaft;
a plurality of first slits whose number corresponds to the number of cylinders, said first slits being equally spaced along a circumferential direction of the rotor plate, and each slit forming a first predetermined degree of arc along the circumferential direction, the first predetermined degree of arc being equal among the first slits; and
a second slit formed between two of the first slits, said second slit having a second predetermined degree of arc along the circumferential direction, which is smaller than the first predetermined arc,
wherein the first slits and the second slit being aligned in the same radial length from a center of rotation of the rotor plate, the first means outputting a first signal indicative of a crank angular position during a passage of each first slit through the photo sensor and a second signal indicative of a cylinder identification reference during a passage of the second slit through the photo-electric sensor, each first slit being formed at a position corresponding to a crank angular position at least within 90° before a top dead center in a compression stroke and the second slit being formed at a position corresponding to the crank angular position at least within 30° after the top dead center in the compression stroke; and b) second means for carrying out at least one of a fuel injection quantity control and ignition timing control on the basis of the first and second signals derived by the first means.

6. An apparatus as set forth in claim 5, wherein the engine has four cylinders and wherein the first signal rises at about 75° CA before the TDC in the compression stroke and falls at about 5° CA before the TDC and the second signal rises at about 5° CA after the TDC.

7. An apparatus as set forth in claim 5, wherein the second means comprises:

third means for detecting whether the engine driving condition is in an idling or in a deceleration state;
fourth means for measuring an engine revolution speed N on the basis of a time duration between rising edges of the first signal; and
fifth means for carrying out a variable ignition timing control on the basis of an ignition timing angular value previously stored according to a function of the engine speed N and intake air quantity $Q_a$ and carrying out a fixed ignition timing control when the engine driving condition is in the idling and in the deceleration state.

8. An apparatus as set forth in claim 6, wherein a pulsewidth of a high H level of the first signal is set to 70° CA, a width of a low L level of the second signal is set to 110° CA, a power supply time to ignition surge voltage generating means in the fixed ignition timing control is the same as the pulsewidth of the first signal and the ignition timing is the same as a falling edge of the first signal, and the power supply time thereto in the variable ignition timing control is derived with the power supply time converted into a power supply crank angle and the ignition timing is set at a predetermined angle with respect to the H level of the first signal being the reference.

9. An apparatus as set forth in claim 8, wherein the second means carries out a simultaneous fuel injection for all cylinders on the basis of the first signal when the engine is started and carries out, so-called, sequential fuel injection in which each cylinder receives the fuel injection quantity before TDC in the compression stroke on the basis of both first and second signals.

10. An apparatus as set forth in claim 9, wherein the second means carries out the simultaneous fuel injection for all cylinders when an engine start switch is turned ON and/or the engine revolution speed is below a predetermined value.

11. An apparatus as set forth in claim 10, wherein the predetermined value is 400 R.P.M.

12. An apparatus for a multi-cylinder, four-cycle, spark-ignited engine, comprising:
   a) first means comprising:
      a photo-electric sensor;
      a rotor plate which rotates in synchronization with a rotation of an engine crankshaft;
      a plurality of first slits whose number corresponds to the number of cylinders, said first slits being equally spaced along the circumferential direction of the rotor plate; and
      a second slit formed between two of the first slits, wherein the first slits and the second slit being aligned in the same radial length from a center of rotation of the rotor plate, the first means outputting a first signal indicative of a crank angular position during a passage of each first slit through the photo sensor and a second signal indicative of a cylinder identification reference during a passage of the second slit through the photo-electric sensor, each first slit being formed at a position corresponding to a crank angular position at least within 90° before a top dead center TDC in a compression stroke and the second slit being formed at a position corresponding to the crank angular position at least within 30° after the TDC in the compression stroke; and
   b) second means for carrying out at least one of a fuel injection quantity control and ignition timing control on the basis of the first and second signals derived by the first means, wherein said second means comprises:
      third means for detecting whether the engine driving condition is in an idling or in a deceleration state;
      fourth means for measuring an engine revolution speed N on the basis of a time duration between rising edges of the first signal; and
      fifth means for carrying out a variable ignition timing control on the basis of an ignition timing angular value previously stored according to a function of the engine speed N and intake air quantity $Q_a$, and carrying out a fixed ignition timing control when the engine driving condition is in the idling and in the deceleration state, wherein the fourth means measures the engine revolution speed N using the following equation $N = 60/2 \times T_{180}$, wherein $$T_{180} = \sum_{i=n-1}^{n} DT_i,$$

wherein $DT_i$ denotes the measured time data corresponding to the crank angle from the rising edge of the first signal to the falling edge of the first signal, from the falling edge of the first signal to the rising edge of the second signal, and from the rising edge of the second signal to the falling edge of the second signal, and from the falling edge of the second signal to the rising edge of the first signal.

13. An apparatus for a multi-cylinder, four-cycle, spark-ignited engine, comprising:
   a) first means comprising:
      a photo-electric sensor;
      a rotor plate which rotates in synchronization with a rotation of an engine crankshaft;
      a plurality of first slits whose number corresponds to the number of cylinders, said first slits being equally spaced along the circumferential direction of the rotor plate; and
      a second slit formed between two of the first slits, wherein the first slits and the second slit being aligned in the same radial length from a center of rotation of the rotor plate, the first means outputting a first signal indicative of a crank angular position during a passage of each first slit through the photo sensor and a second signal indicative of a cylinder identification reference during a passage of the second slit through the photo-electric sensor, each first slit being formed at a position corresponding to a crank angular position at least within 90° before a top dead center TDC in a compression stroke and the second slit being formed at a position corresponding to the crank angular position at least within 30° after the TDC in the compression stroke; and
   b) second means for carrying out at least one of a fuel injection quantity control and ignition timing control on the basis of the first and second signals derived by the first means, wherein said second means comprises:
      third means for detecting whether the engine driving condition is in an idling or in a deceleration state;
      fourth means for measuring an engine revolution speed N on the basis of a time duration between rising edges of the first signal; and
      fifth means for carrying out a variable ignition timing control on the basis of an ignition timing angular value previously stored according to a function of the engine speed N and intake air quantity $Q_a$, and carrying out a fixed ignition timing control when the engine driving condition is in the idling and in the deceleration state, wherein the fifth means comprises:
         sixth means for reading the engine revolution speed N, a basic fuel injection quantity $T_p$ derived on the basis of the engine speed N and the intake air quantity $Q_a$, an engine coolant temperature $T_w$ derived from an engine coolant temperature sensor, and opening angle of an engine throttle valve of an intake air passage of the engine TVO;

seventh means for detecting the predetermined ignition timing advance angle value $\theta_{ADV}$ with respect to the TDC from the ignition timing angle table derived from a function of N, $T_p$, and $T_w$;

eight means for reading a pulse duration between the present falling and rising edges of the first signal $DTB_n$;

ninth means for determining whether the opening angle of the throttle valve exceeds a predetermined opening angle value;

tenth means for reading the previous $DTB_n$, $DTB_{n-1}$;

eleventh means for deriving an angular acceleration correction coefficient K from a function of the engine revolution speed N;

twelveth means for calculating a power supply time duration $t_{IGN}$ to the ignition surge voltage generating means using the following equation when the opening angle of the throttle valve exceeds the predetermined opening angle value:

$$t_{IGN} = \frac{\{DTB_n + K(DTB_n - DTB_{n-1})\}}{\theta_1} \times (\theta_2 - \theta_{ADV})$$

wherein $\theta_2$ denotes 75° crank angle from the first signal after $\theta_1$ which is the crank angle before $\theta_2$ from the falling edge of the first signal to the rising edge of the first signal; and thirteenth means for setting a timer so that the ignition is carried out after the power supply time duration $t_{IGN}$ is ended.

14. An apparatus as set forth in claim 13, wherein when the ninth means determines whether the opening angle of the throttle valve is below the predetermined opening angle value, and the twelfth means calculates the power supply duration using the following equation:

$$t_{IGN} = \frac{DTB_n}{\theta_1} \times (\theta_2 - \theta_{ADV})$$

15. A method for detecting an engine revolution speed and engine cylinder identification and for controlling an engine operation according to the detected engine speed and the identified engine cylinder, using a first means comprising:

a rotor plate which rotates in synchronization with a rotation of an engine crankshaft;

a plurality of first slits whose number corresponds to the number of cylinders, said first slits being equally spaced along a circumferential direction of the rotor plate, and each slit forming a first predetermined degree of arc along the circumferential direction, the first predetermined degree of arc being equal among the first slits; and a second slit formed between two of the first slits, said second slit having a second predetermined degree of arc along the circumferential direction, which is smaller than the first predetermined arc, wherein the first slits and the second slit being aligned on the same radial length from a center of rotation of the rotor plate, the method comprising the steps of:

outputting a pulse train signal having a first level change derived from each of the first slits and corresponding to a first crank angular position within a range of a first predetermined degree before a top dead center TDC in a compression stroke;

outputting a pulse train signal having a second level change derived from the second slit and corresponding to a second angular position within a range of a second predetermined degree after the TDC in the compression stroke; and controlling at least one of a fuel supply quantity control to the engine and an ignition timing control, on the basis of the pulse train signals of the first level change and the second level change.

* * * * *